Patented Feb. 14, 1928.

1,658,998

UNITED STATES PATENT OFFICE.

WILLIAM B. NEWKIRK, OF RIVERSIDE, ILLINOIS, ASSIGNOR TO INTERNATIONAL PATENTS DEVELOPMENT COMPANY, OF WILMINGTON, DELAWARE, A CORPORATION OF DELAWARE.

PROCESS OF MAKING GRAPE SUGAR.

No Drawing.     Application filed August 6, 1924.     Serial No. 730,375.

My invention relates to the manufacture of saccharine products, more especially dextrose, through the crystallization of the sugar from a watery solution produced by the conversion of starch by acid hydrolysis, for example, or other suitable process, and the separation of the crystals from the mother liquor by centrifugal action, or other available means, such method of manufacture being disclosed in Patent No. 1,471,347 granted to me on October 23, 1923; and the invention has for a primary object to provide a novel and improved method of treating the converted liquor whereby it is possible to obtain a high purity crystalline product from converted liquors, which, because of the quality and character of their impurities, cannot by methods heretofore known be made to yield such high purity product, or can be manipulated to yield such product only with difficulty or uncertainty as to results. A further object accomplished by the treatment contemplated by my invention is an increase in yield of crystalline dextrose or other sugar as the case may be.

For example, in carrying out the "three boiling process" of the above mentioned patent it is difficult and frequently impossible, as the patent states, to obtain a "third sugar" of high purity from the hydrol, or mother liquor centrifuged from the second yield of crystals. This is because impurities are present in the second hydrol in quantity and of a character to interfere with the proper growth of a mass of crystals of a size and structure allowing the mass to be completely purged in the centrifugal machine. My present invention provides a method of treating a dextrose solution of this relatively impure character whereby, after crystallization of the dextrose has taken place, the magma may be centrifuged so as to throw out the mother liquor with substantial completeness and thereby give a yield of sugar which will be of very high purity, 99% dextrose, for example, or higher. This novel treatment of the sugar solution has another advantage in that it changes the character of the impurities, as will be described, so that a larger quantity of the dextrose will be crystallized out of the solution. It will be understood, however, that the present invention is not confined to the treatment of hydrols or mother liquors produced as described in the patent referred to, but is applicable to other dextrose or starch conversion solutions, the impurities of which prevent satisfactory purging of the crystallized magma by centrifugal action or other available method of separation.

In accordance with my invention, as herein claimed, the impure dextrose solution, for example, the second hydrol of Patent 1,471,347, preferably after being concentrated, instead of being run immediately into the crystallizer, as described in the patent referred to, is first introduced into a suitable vessel or vessels, or cast upon the floor, and allowed to stand until, through evaporation of moisture and the crystallization of the dextrose, the mass has become solid or semisolid. It is then melted, either with or without the addition of water, and, if water has been added, is concentrated in a vacuum pan and is thereafter subjected to conditions bringing about crystallization of the dextrose and is finally centrifuged to remove mother liquor from the crystalline product.

The interposed step of solidifying the massecuite effects, I have discovered, such a change in the impurities that after crystallization has taken place, the mother liquor can be removed from the crystals by centrifuging to a very much greater extent than has heretofore been possible with solutions of the assumed relatively high impurity content. The yield of crystallized dextrose is also increased.

The reason for this seems to be that the reduction of temperature and concentration of the impurities resulting from the solidification of the mass brings about a flocculation of the colloidal impurities, which remain in the flocculated state when the sugar is melted up and in this state interfere less with the formation of a purgable mass of crystals than they would have done in their original colloidal or highly dispersed condition. Whether this theory is sound or not, practical operation of the process has demonstrated that the results are as stated.

While the best effect is obtained by reducing the massecuite to a state of solidity, or to a state approaching solidity, beneficial results pro tanto, may be obtained, depending upon the quantity and character of the impurities, by a lesser concentration of the material. The melted liquor may be filtered either mechanically or through bone char. This filtration, which is an optional step in the process, will, when employed remove impurities which could not be removed from the converted liquor before solidification, and this in itself indicates the flocculation of colloids above referred to that is change of soluble impurities into an insoluble state. Filtration may be desirable at this stage, particularly when the impurity content of the converted liquor is high.

It is possible to use the improvement of the present invention in the manufacture of either a hydrate or an anhydrous sugar. The operations of concentrating the liquor, after solidification and melting, crystallizing the same and separating the mother liquor from the crystals, may be carried on substantially as described in Patent 1,471,347, at the densities and temperatures therein stated for producing the hydrate or the anhydrous product. Preferably, however, the process will be modified in accordance with the invention disclosed in my co-pending application, Serial No. 705,780, filed April 11, 1924 (continuation filed September 10, 1924, Serial No. 736,945 patented January 6, 1925 as No. 1,521,830), whereby the concentrated liquor is first cooled before it goes to the crystallizer and is mixed in the crystallizing vessel with a relatively large amount of solid phase dextrose preferably in the form of "foots", that is wet seed from the last crystallizing operation which ordinarily will contain from four-tenths to six-tenths solids and the balance mother liquor. For example, at the end of each crystallizing operation a considerable portion of the magma is allowed to remain in the crystallizer, say forty percent, and the fresh liquor mixed with this material before the crystals have set. The advantage of this method of crystallization is that the solid phase present in such large amounts at the beginning of each crystallizing operation dominates and controls said operation, other factors being of minor importance. That is to say, the quantity of the solid phase is a significant factor in controlling crystallization instead of merely exciting or initiating crystallization as is the case when one uses the small amounts of seed heretofore used in crystallizing dextrose from aqueous solutions. After several successive batches have been made the crystals assume a more or less uniform character, and because used in large amounts give a uniform character, so far as crystalline structure is concerned, to the solid sugar produced in the subsequent batches. Both the hydrate and the anhydrous type of sugar can be made over wider ranges of crystallizing temperatures. Moreover lack of uniformity in the character of the converted liquors, does not have such serious results.

However, I do not claim generically, herein the above described use of a dominant quantity of the solid phase, as that subject matter is claimed in the pending application above referred to.

I have referred to the first crystallizing operation as a "reducing the converted liquor to a solid or semi-solid state" to distinguish this step from a crystallizing operation carried on under such conditions as to produce a purging magma, i. e., a mass of crystals of normal crystalline form and substantially uniform size from which the mother liquor can be removed with substantial completeness. According to this invention no serious effort is made to effect crystallization of this character during the first crystallizing operation, with the result that the solid or semi-solid mass will probably contain considerable quantities of imperfect and minute crystals referred to as "false grain".

I claim:

1. Method of treating impure starch converted dextrose solutions which consists in reducing the same to a substantially solid state to produce flocculation of colloidal impurities and then melting the crystalline material.

2. Method of treating impure starch converted dextrose solutions which consists in reducing the same to a substantially solid state to produce flocculation of colloidal impurities, then melting the said solidified substance and filtering the solution to remove the flocculent impurities.

3. Method of manufacturing high purity crystalline dextrose from a starch converted dextrose solution which comprises crystallizing the solution to produce flocculation of colloidal impurities, melting the crystallized material, recrystallizing it with agitation to keep the crystals as formed in dispersion throughout the solution and removing the mother liquor from the crystals.

4. Method of manufacturing high purity crystalline dextrose from a starch converted dextrose solution which comprises crystallizing the solution to produce flocculation of colloidal impurities, melting the crystallized material, filtering the melt to remove the flocculated impurities rendered insoluble by the crystallizing operation, recrystallizing the solution with agitation to keep the crystals as formed in dispersion through the liquid, and removing the mother liquor from the crystals.

5. Method of purifying a starch converted dextrose solution which comprises crystallizing the dextrose in the solution to bring about flocculation of colloidal impurities, melting the crystallized dextrose and filtering the resulting solution.

WILLIAM B. NEWKIRK.